Aug. 27, 1957  M. M. HURST  2,803,892
AUTOMOBILE DRYING DEVICE AND METHOD
Filed April 12, 1952
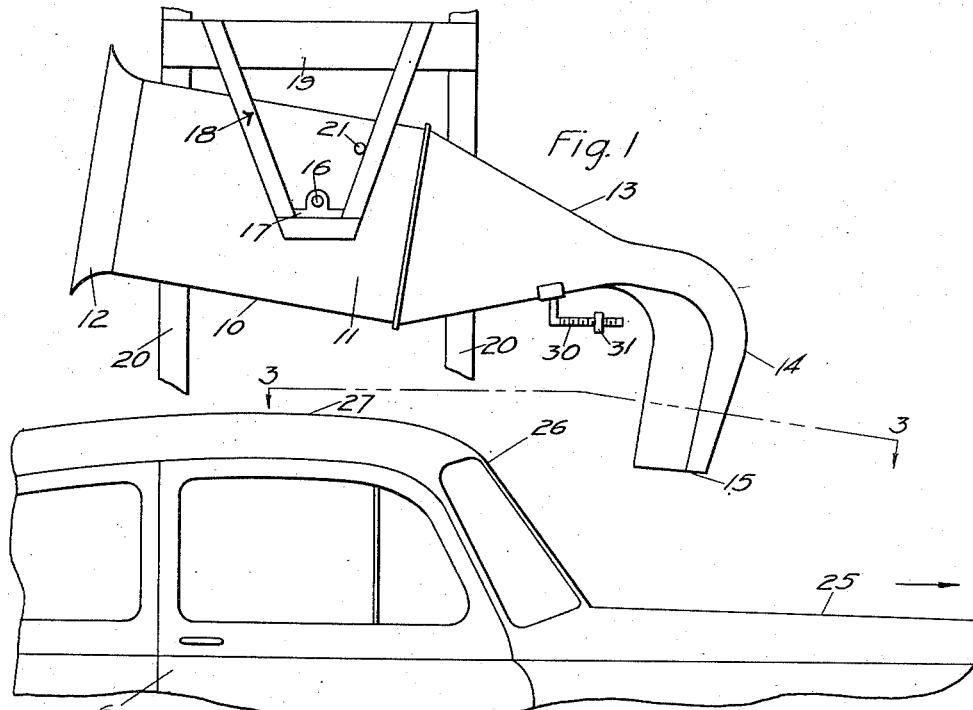
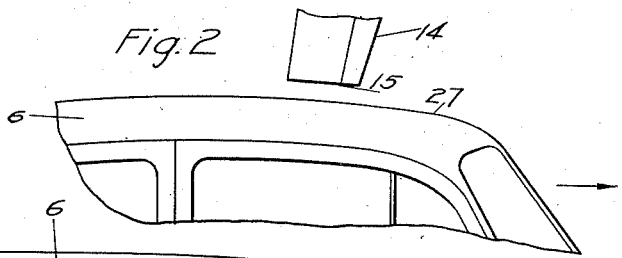
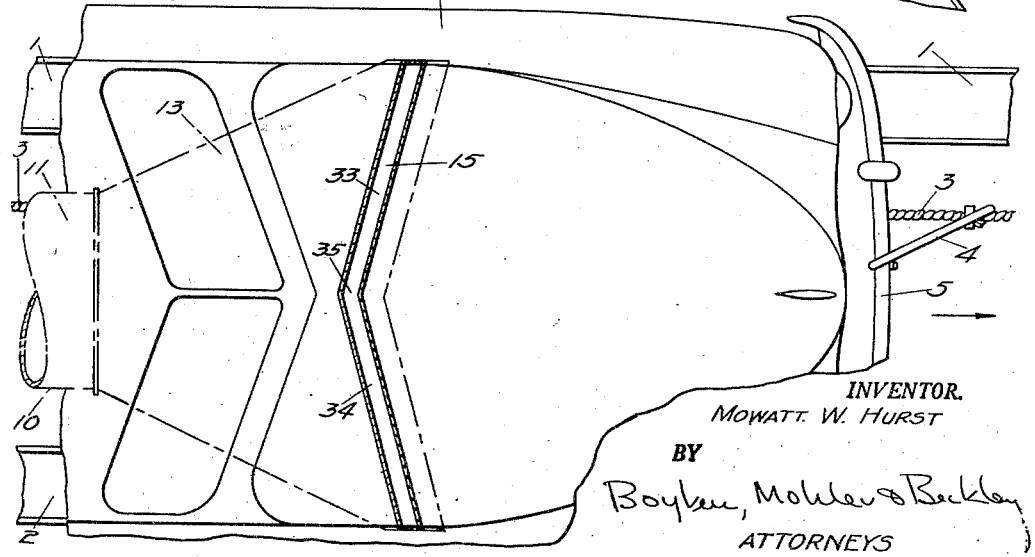
INVENTOR.
MOWATT W. HURST
BY
Boyken, Mohler & Beckley
ATTORNEYS

United States Patent Office 2,803,892
Patented Aug. 27, 1957

2,803,892

AUTOMOBILE DRYING DEVICE AND METHOD

Mowatt M. Hurst, Redwood City, Calif.

Application April 12, 1952, Serial No. 282,064

4 Claims. (Cl. 34—229)

This invention relates to automobile washing and drying installations and more particularly to a method and apparatus for drying the upper surfaces of an automobile.

In automobile washing installations, it is customary to dry the outer surfaces of the automobile by discharging air at a relatively high rate of discharge against said surfaces after the latter have been washed and rinsed. The laterally outwardly facing surfaces on the opposite sides of the automobile present a relatively simple problem inasmuch as fans may be stationarily positioned alongside the path of travel of the automobile with the discharge orifices of such fans directed generally inwardly toward the automobile. Inasmuch as all automobiles have about the same width the discharge orifice of each fan may be stationarily positioned closely adjacent the sides of the automobile to achieve maximum drying effect.

The upwardly facing surfaces of the automobile present a more difficult problem because the hood of the automobile is substantially lower than the top of the body portion of the automobile and in addition the variation between the height of different automobiles is much greater than the variation in width. For the above reasons, it has not been possible heretofore to position the air discharge nozzle in a position which will insure an optimum drying effect because a stationary discharge nozzle must be positioned at a height greater than the height of the highest automobile. The result of such an arrangement is that the hood of the automobile is not properly dried and even the top of the body portion of the automobile may be so far below the stationary nozzle that the velocity of the air is considerably reduced when it reaches the upper surface of the automobile.

Attempts have been made in the past to swingably support a fan nozzle above the automobile and provide wheels on such fan for engaging the upwardly facing surfaces of the automobile. By such an arrangement the discharge orifice of the nozzle may be positioned any desired distance away from the surface of the automobile.

The above procedure has several disadvantages, one being that the wheels leave streaks on the surface of the automobile regardless of the care taken in selecting the material for forming the wheels. Such streaks are of course undesirable and must be removed manually with a loss in time and manpower.

Another disadvantage of providing a wheeled nozzle lies in the danger of injuring accessories on the automobile such as windshield wipers and the like; furthermore upon the wheels initially striking the surface of the automobile the fan structure will bounce upwardly and then back against the automobile thus increasing the possibility of injury to the latter.

A main object of the present invention is to overcome the disadvantages of prior art methods of drying an automobile and still make the air discharge nozzle vertically movable so that it may be positioned closely adjacent all portions of the surfaces to be dried.

Another object of the invention is the provision of an inexpensive apparatus for mounting the discharge nozzle for vertical movement toward and away from the upwardly facing surface of the automobile so that the nozzle may be positioned closely adjacent the automobile regardless of the height of such automobile.

Still another object is the provision of an apparatus and method for automatically adjusting the vertical position of the air discharge nozzle so that the same may be positioned closely adjacent the upwardly facing surface of the automobile at all times to achieve an optimum drying effect.

Yet another object of the invention is the provision of a method and apparatus for drying the upwardly facing surfaces of an automobile uniformly without engaging such surfaces in any manner.

Other objects and advantages will be apparent from the attached specification and drawings.

Fig. 1 is a fragmentary side elevational view of the upper portion of an automobile showing the apparatus of the invention above said automobile with the discharge nozzle over the hood of the automobile.

Fig. 2 is a view similar to Fig. 1, but with the automobile moved forwardly from its position in Fig. 1 and with the discharge nozzle moved upwardly to a position above the top of the body portion of the automobile.

Fig. 3 is a horizontal cross-sectional view through the discharge nozzle as taken along lines 3—3 of Fig. 1.

In detail, the invention is adapted to be employed as part of an automobile washing installation which includes a pair of horizontally spaced tracks 1, 2 (Fig. 3) on which the wheels of the automobile are adapted to roll. The conventional practice is to run a rope 3 between pulleys (not shown) at the opposite ends of the path of travel defined by tracks 1, 2 and secure the automobile 6 to said rope by clamping member 4 which may be secured to the bumper 5 of the automobile. In this way, the automobile is moved along a horizontal path of travel at a uniform rate of speed.

For the purposes of the present invention, it makes no difference how the automobile is moved and it is obvious that it may be run under its own power if desired.

After the automobile is washed and rinsed it moves to a drying station where the outer surfaces of the automobile are dried by blasts of air discharged from nozzles directed toward the automobile. Only the means for drying the upwardly facing surfaces of the automobile are shown in the drawings and any desired means may be employed to dry the laterally outwardly facing surfaces of the automobile.

The invention comprises a conventional fan generally designated 10 and preferably of the "axial-flow" type which has a cylindrical housing 11 within which a propeller and motor (not shown) are positioned. The intake end of the fan is flared outwardly as at 12 and the discharge end is provided with a transition section generally designated 13 which is secured to the fan in any convenient manner. A discharge nozzle 14 is formed integral with the transition section 13 and is provided with a discharge orifice 15 which is of a width substantially equal to the width of an automobile (Fig. 3).

The fan 10 is positioned with its axis generally horizontal and is provided on its opposite sides with journals 16 which are adapted to be received in bearings 17 for pivotally supporting the fan structure comprising the fan and its associated transition section and nozzle.

The bearings 17 are supported on the lower end of a frame generally designated 18 which in turn may be secured at its upper end to any desired structural members such as 19. Vertical posts 20 at opposite sides of the path of travel of the automobile serve to support the above described structure in a position above the automobile (Fig. 1). If desired, the bearings 17 may be supported on any available structure attached to the overhead or ceiling.

Also secured to the cylindrical housing 11 of the fan 10 is a stop 21 which is adapted to engage the frame 18 or any other stationary member to prevent downward swinging of the nozzle 14 beyond a predetermined lowermost position.

Referring to Fig. 1, it will be seen that the fan 10 is positioned so that its discharge end is somewhat below its intake end and with the nozzle 14 substantially below the fan. The position of journals 16 is selected so that the fan and its associated discharge nozzle are in an unbalanced condition with the discharge end of the structure being the heavy end. Thus when the fan is not running the stop 21 will be against the frame 18 and the effect of gravity will tend to urge the structure in a clockwise direction (Fig. 1).

It will be apparent that when the fan is started the reaction of the discharging air against nozzle 14 will urge said nozzle upwardly thus reducing the amount of unbalance. However, when the fan structure is in the position of Fig. 1 with the nozzle 14 spaced upwardly from the hood 25 of an automobile the position of journals 16 is such that the fan structure preferably remains slightly unbalanced and tending to swing in a clockwise direction with stop 21 in engagement with frame 18. In the position of Fig. 1 it will be apparent that the stream from nozzle 14 will be substantially unobstructed inasmuch as the nozzle 14 is spaced a considerable distance upwardly from the hood 25.

Referring to Fig. 1, if it is assumed that the automobile is moved to the right so that the windshield portion 26 moves toward the discharge orifice 15 of the nozzle 15 it will be apparent that the air stream from said orifice will become obstructed by said windshield portion. When the windshield portion 26 moves to a position closely adjacent the orifice 15 the pressure of the air between said orifice and the windshield portion builds up so that an additional reaction is established tending to urge the nozzle upwardly. The condition of unbalance of the fan structure should therefore be such that the structure swings in a counter-clockwise direction when this last mentioned reaction is impressed upon the nozzle. It will be understood of course that the upwardly directed force due to the compression of the air stream between the discharge orifice 15 and the adjacent automobile surface is in addition to the normal reaction on said orifice due to the discharge of air therefrom.

I have discovered that the above described counter-clockwise movement of the fan structure will occur when the adjacent upwardly facing surface of the car is about two or three inches away from the discharge orifice 15. Upon the initial upward swinging of the nozzle 14 the inertia of the fan structure causes the structure to oscillate slightly with the orifice 15 moving toward and away from the adjacent surface of the automobile. However, when the unbalanced condition of the fan structure is properly adjusted the nozzle 15 will never engage the automobile and the slight oscillatory effect above noted will be quickly dampened out.

As the top 27 of the body portion of the automobile passes under the nozzle 14 the distance between said top and the orifice 15 will be about as shown in Fig. 2 with the nozzle spaced from the top about two or three inches from the orifice. As the body of the automobile passes under the nozzle 14 the latter will move downwardly as the vertical extent of the automobile becomes less so that the orifice remains the same distance from the top until stop 21 engages frame 18. The above described operation assumes a fan structure of about the proportions shown in the drawings and a twenty horsepower axial-flow fan. It will be understood, of course, that the size of the fan and the nozzle may be varied as desired so long as the resulting structure is balanced so as to give the effect described above.

The mounting of the fan structure must, of course, be done accurately to achieve the desired result and it is preferred that some adjustable means be provided to achieve proper balance when the fan is operating as shown in Fig. 2. To this end a horizontally extending threaded rod 30 may be rigidly secured to the underside of the transition section 13 of the fan structure. A nut 31 is threadedly carried by said rod so that by turning the nut and moving the same along the length of the rod 30 the proper condition of balance may be achieved when the fan and automobile are in the position of Fig. 2.

The fan structure may be assembled so that the lowermost position of the nozzle 14 is somewhat closer to the hood 25 of the automobile than shown in Fig. 1. The operation of the device as above described would of course be the same. However, with such a change, it would be necessary to mount the fan structure higher and make the same longer to permit the greater amplitude of swing required. The additional cost involved would in most cases not be justified. Furthermore, because of the fact that the hood slants downwardly more rapidly than the top of the body of the automobile the hood is more easily dried and the discharge nozzle need not be spaced as close to the hood as the top of the automobile. In addition, it will be noted that the fans employed for drying the laterally outwardly facing sides of the automobile will have a drying effect on the hood which they do not have on the top.

As best seen in Fig. 3 the discharge orifice 15 of the nozzle 14 is preferably formed with two straight angularly disposed portions 33, 34 which are in intersecting relationship with the juncture 35 of said portions trailing with respect to portions 33, 34 relative to the direction of travel of the automobile. The angle between the portions 33, 34 and a plane at right angles to the path of travel of the automobile is preferably about 15°.

By this structure, the water which is lying on the upwardly facing surfaces of the automobile will be moved laterally outwardly and rearwardly of the automobile during the drying operation. It will be noted that the discharging air stream should also make a slight angle (about 10°) to the vertical so that the water is moved rearwardly during the drying. By forming the nozzle about as shown in Fig. 1 this effect may be readily accomplished.

The present invention permits the drying operation to be performed on an automobile without touching the automobile in any manner except for the air stream directed thereon. The discharge orifice 15 of the nozzle 14 very closely follows the change in height of the automobile top and achieved maximum drying efficiency.

It is to be understood that the detailed description herein given is merely by way of illustrating the preferred form of the invention and minor changes of a design nature may be made without departing from the scope of the invention as defined by the following claims.

I claim:

1. In an automobile drying installation, means for moving an automobile along a horizontal path of travel, a fan positioned over said path and including power means for driving the same, an air discharge nozzle carried by said fan for discharging air in a direction generally downwardly against the upwardly facing surface of a car in said path, means pivotally supporting said fan and nozzle for swinging about a horizontal axis and a stop for limiting the downward movement of said nozzle to a lower position above the hood of said automobile, said fan and nozzle being unbalanced and in said lower position during said discharge when said discharge is relatively unobstructed, and the amount of said unbalance being such that said fan and nozzle will become balanced when a portion of said surface is adjacent said nozzle and the reaction of the air compressed between said surface and said nozzle is acting upwardly on the latter.

2. In an automobile drying installation, means for moving an automobile along a horizontal path of travel, a fan positioned over said path and including power means for driving the same, an air discharge nozzle carried by said fan for discharging air in a direction generally downwardly against the upwardly facing surface of a car in said path, means pivotally supporting said fan and nozzle for swinging about a horizontal axis and a stop for limiting the downward movement of said nozzle to a lower position above the hood of said automobile, said fan and nozzle being unbalanced and in said lower position during said discharge when said discharge is relatively unobstructed, and the amount of said unbalance being such that said fan and nozzle will become balanced when a portion of said surface is adjacent said nozzle and the reaction of the air compressed between said surface and said nozzle is acting upwardly on the latter, said nozzle having a discharge orifice substantially the width of an automobile and formed with a pair of angularly disposed portions in intersecting relationship with the junction of said portions adjacent the center of said path and with the remainder of said portions extending laterally outwardly and forwardly thereof relative to the direction of travel of said automobile whereby water on said surface will be urged laterally outwardly and rearwardly thereof.

3. In an automobile drying installation, means for moving an automobile along a horizontal path of travel, a fan structure positioned over said path and including power means for driving said fan and a discharge nozzle integral with said fan for movement therewith, pivot means for swingably supporting said structure with said nozzle directed downwardly and rearwardly relative to the direction of travel of said automobile for discharging air against the upwardly facing surfaces of an automobile in said path, stop means for limiting downward movement of said nozzle to a lower position with the discharge orifice of said nozzle above the hood of such automobile and below the top of the body of such automobile, said structure being unbalanced and in said lower position during discharge when said discharge is relatively unobstructed whereby said structure will be swung to a position above said top when the latter is moved to a position adjacent the discharge orifice of said nozzle.

4. In an automobile drying installation, means for moving an automobile along a horizontal path of travel, a fan structure positioned over said path and including power means for driving said fan and a discharge nozzle integral with said fan for movement therewith, pivot means for swingably supporting said structure with said nozzle directed downwardly and rearwardly relative to the direction of travel of said automobile for discharging air against the upwardly facing surfaces of an automobile in said path, stop means for limiting downward movement of said nozzle to a lower position when the discharge orifice of said nozzle above the hood of such automobile and below the top of the body of such automobile, said structure being unbalanced and in said lower position during discharge when said discharge is relatively unobstructed whereby said structure will be swung to a position above said top when the latter is moved to a position adjacent the discharge orifice of said nozzle, adjustable means carried by said structure for varying the degree of unbalance to a point at which said orifice will automatically be positioned at a predetermined distance from the upwardly facing surface of said top.

References Cited in the file of this patent
UNITED STATES PATENTS

| | | |
|---|---|---|
| 1,140,873 | Carter | May 25, 1915 |
| 1,697,879 | Olson | Jan. 8, 1929 |
| 2,132,303 | Lathrop | Oct. 4, 1938 |
| 2,440,157 | Rousseau | Apr. 20, 1948 |
| 2,448,834 | Rousseau | Sept. 7, 1948 |